Aug. 26, 1952     G. A. JERGENSON     2,608,366
CONVERTIBLE SEAT AND SLEEPING BERTH IN AIRCRAFT
Filed Feb. 8, 1950     2 SHEETS—SHEET 1

INVENTOR
GEORGE A. JERGENSON
BY
his ATTORNEYS.

Aug. 26, 1952     G. A. JERGENSON     2,608,366
CONVERTIBLE SEAT AND SLEEPING BERTH IN AIRCRAFT

Filed Feb. 8, 1950     2 SHEETS—SHEET 2

INVENTOR
GEORGE A. JERGENSON
BY
ATTORNEYS

Patented Aug. 26, 1952

2,608,366

UNITED STATES PATENT OFFICE 2,608,366

CONVERTIBLE SEAT AND SLEEPING BERTH IN AIRCRAFT

George A. Jergenson, Santa Barbara, Calif., assignor to Pan American World Airways, Inc., New York, N. Y., a corporation of New York Application February 8, 1950, Serial No. 143,117

18 Claims. (Cl. 244—118)

This invention relates to convertible seat and sleeping berth arrangements for passenger vehicles, and has particular reference to such arrangements for passenger aircraft, although the invention is not limited to that use.

Because of the limitations on space and weight, the conversion of aircraft passenger seats into comfortable sleeping berths has long presented a problem, since more space is required for sleeping accommodations than for a seat and also more equipment, whereas additional space is not available without uneconomically sacrificing seating space, and additional equipment occupies valuable space when not in use and uneconomically increases the dead load at all times. Staggering the seats diagonally upwardly and downwardly above the passageway floor has been suggested, and while that has been a step in the right direction, the additional space necessary for converting the seats to berths has not yet been provided without materially decreasing the number of seats, and the increased equipment weight problem remains.

In accordance with the present invention, a passenger vehicle convertible seat and berth combination is provided, which does not materially reduce the available seating space when the seats are converted into berths and which does not appreciably increase the dead weight of the vehicle equipped with the combination.

In a preferred embodiment of the invention, the seats are placed back-to-back, lengthwise of the vehicle, and alternate seats are placed substantially above and the remaining seats are placed below the passageway floor, with the back of the upper seat arranged to recline over the back of the adjacent lower seat, whose back in turn reclines below the upper seat, so that when both seats are arranged in a substantially horizontal sleeping berth position, the upper berth overlaps the lower berth by approximately half its length, and vice versa. A foot rest provided for each seat becomes a horizontal forward extension of the seat when in horizontal sleeping berth position. Intermediate reclining positions for the seats are available by adjustment thereof.

It will be seen that the normally horizontal seat portion remains substantially fixed in position in the vehicle, but that the longitudinal extension thereof required for horizontal sleeping berth position is afforded by the overlap of the back with respect to the seat below and the underlap of the lower seat with the seat above, without increase in the space requirements, except for a slight increase in head-room over the single level seat arrangement and, except for a few light partitions and a small amount of extra hardware, there is no material dead weight increase, all without sacrificing passenger comfort.

For a more complete understanding of the invention, reference may be had to the accompanying drawings, in which.

Figure 1:
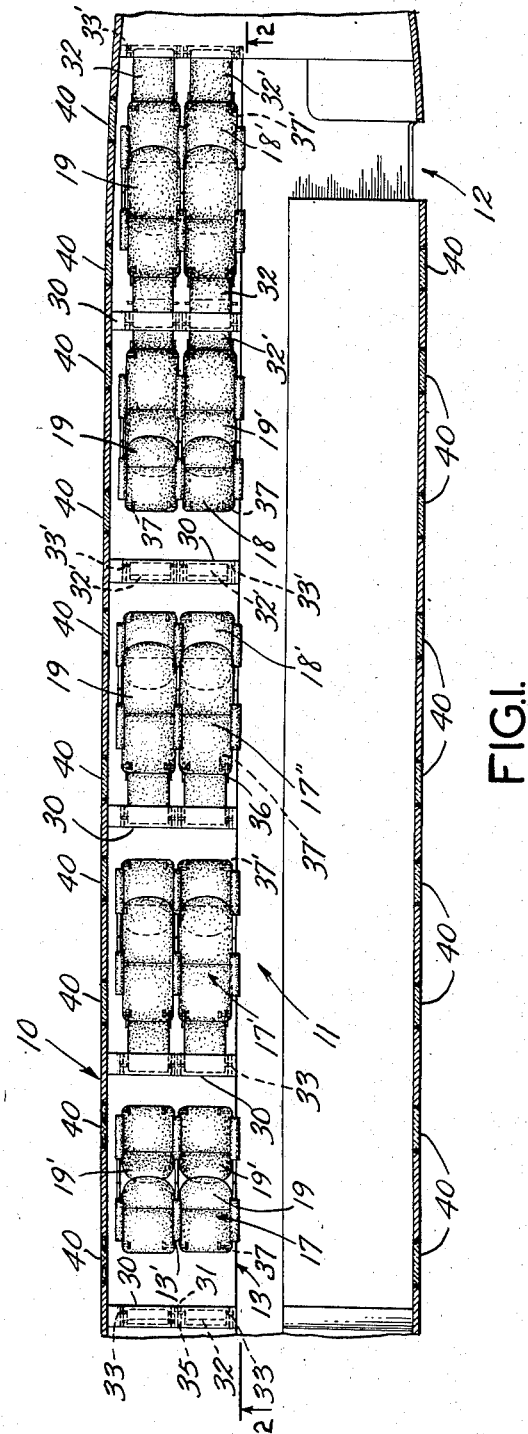
Figure 1 illustrates a vehicle passenger compartment, one-half, e. g., the right-hand or port half, of the compartment being shown in plan, as seen along the line 1—1 of Figure 2, it being understood that the other half of the compartment is substantially the same.

Referring to Figure 1 of the drawings, numeral 10 designates the cabin or passenger compartment of the vehicle embodying the invention, such as an airplane, for example, having a double row of seats at each side of the center aisle or passageway 11, to which access may be had through the door 12 in the lee wall of the fuselage or cabin forming the compartment 10.

Figure 2:
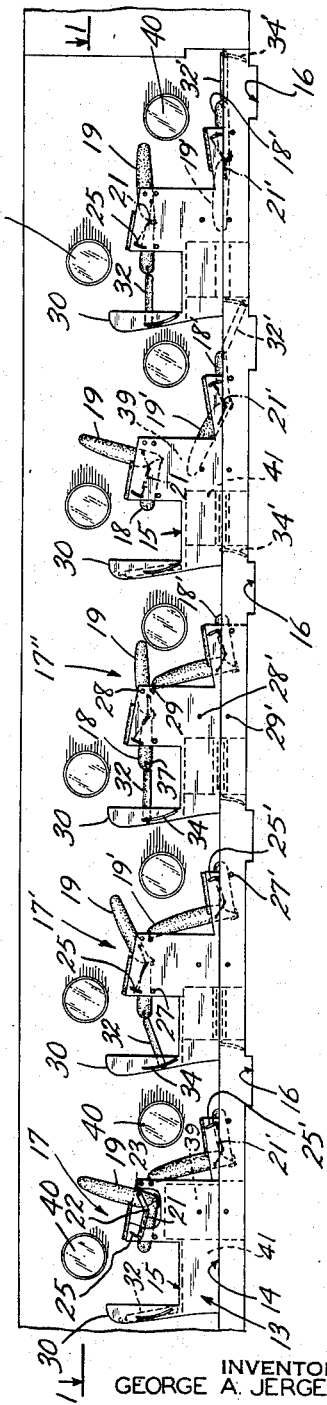
Figure 2 is a side elevation as seen from the passageway and indicated by line 2—2 of Figure 1, certain parts being shown broken away.
Figure 4:
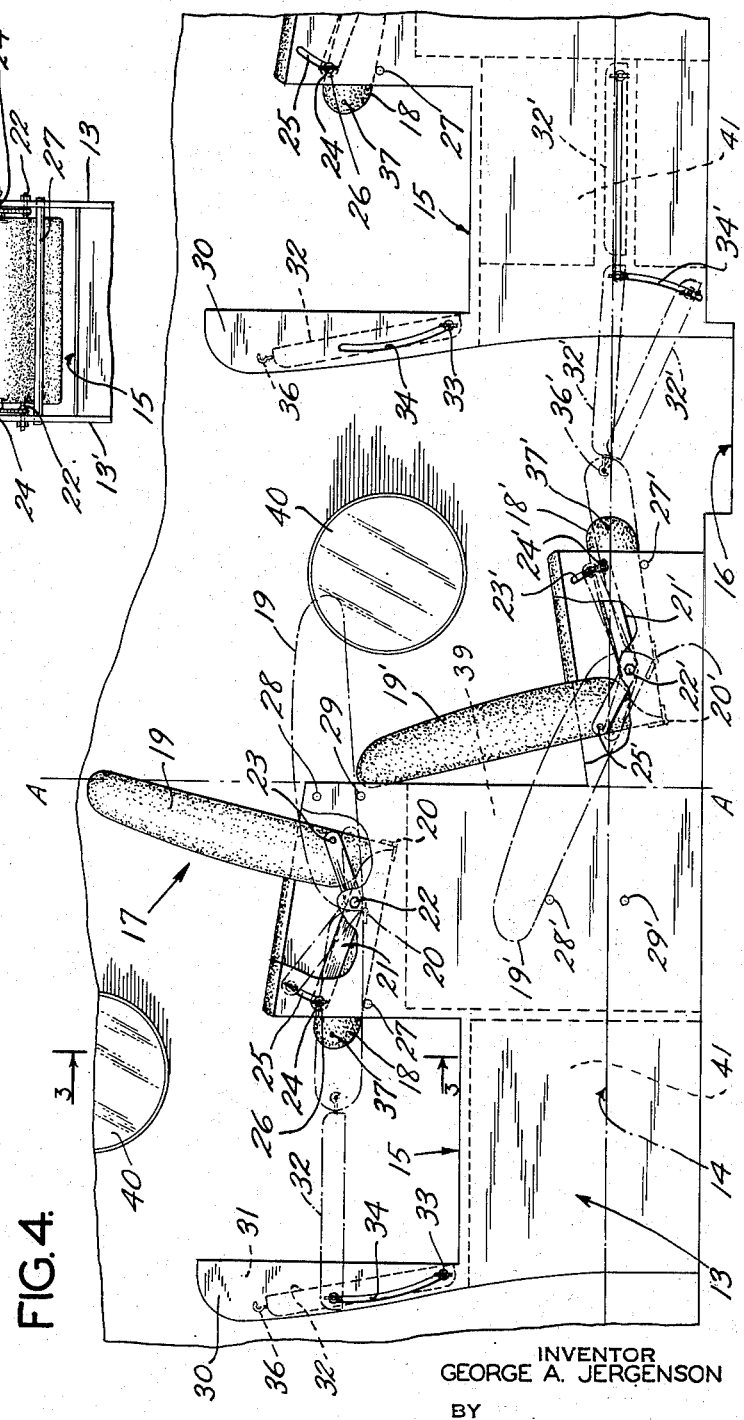
Figure 4 is an enlargement of the left-hand end of Figure 2, with the passageway floor omitted to show the complete lower tier arrangement.

At each side of the passageway 11, the right-hand side shown being illustrative of both, is a vertical panel 13 extending above and below the passageway floor level 14, so that the passenger steps up to the floor level 15 for access to the corresponding upper tier seat and down to floor level 16 for access to the corresponding lower tier seat. The seats are arranged as shown in Figs. 2 and 4, i. e., alternating up and down in staggered vertical relation, with the seats of the upper tier facing in one direction and the lower tier in the opposite direction.

Considering the front or left-hand seat 17 of the pair as typical, the seat portion 18 and the back portion 19 are hinged together at 20 for relative angular movement between them. This angular relation between the seat and back portions 18 and 19 is controlled by a bell crank lever 21 pivoted at its elbow on a bolt 22 fixedly mounted in the panel 13 at one side and in intermediate panel 13' at the other side of the seat 17. The rear end of the bell crank 21 is pivoted to the back portion 19 at 23 and the front end terminates in a lateral threaded pin 24 movable in an arcuate slot 25 in the panel 13 and projecting therethrough, on the left side for the left or aisle seat, and on the right side for the window seat, and threaded for a wing nut 26 or other locking or fastening means.

Figure 3:
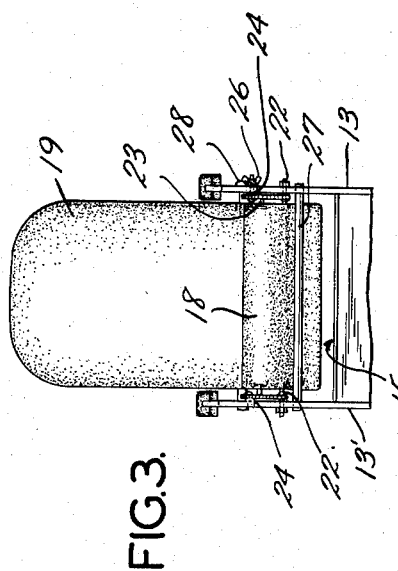
Figure 3 is a front view of one of the seats, as seen along the line 3—3 of Figure 4.

The seat portion 18 rests on, and is slidable forwardly and rearwardly over, a cross bar 27 extending between panels 13 and 13' as shown especially in Fig. 3. Thus, as the back portion 19 of the seat is inclined to the intermediate position shown at 17', the bell crank 21 pivots about its axis 22, causing pin 24 to rise in slot 25 and seat portion 18 to slide forwardly over cross bar 27 as it moves about the hinge 20 connecting it with the back portion 19.

Preferably a stop pin 28, or some other stop means additional to wing nut 26, is provided for firmly holding the back portion 19 in intermediate reclining position, the stop pin 28 being insertable in and removable from an opening in the panel 13. Similarly, when the full reclining position is desired, pin 28 is moved to lower opening 29 in panel 13, so that back portion 19 rests thereon and wing nut pin 24 on the seat portion 18 rises to the upper limit of arcuate slot 25 in side panel 13. This action causes the seat portion 18 to be projected still further forwardly over cross bar 27 until both seat and back portions 18 and 19 lie in the horizontal position indicated at 17'' in Fig. 2.

Extending transversely across the cabin in front of each pair of forwardly-facing seats is a panel 30 forming a recess 31 for containing foot rests 32 for the corresponding seats. The lower or front edge of each foot rest is provided with lateral pins 32 terminating in wing nuts, not shown, but like nuts 26 in Fig. 3. The pins 33 slide in arcuate slots 34 in lateral brackets 35 mounted within recess 31, which allow the foot rest to assume various angles, such as that shown at position 17' which is the intermediate reclining angle, and at 17'' which is the horizontal sleeping berth position, in alignment with the horizontal seat and back portions 18 and 19. The top or inner edge of the foot rest is provided with hooks 36 adapted to pass over and rest on pins 37 at the front edge of the corresponding seat portion 18.

The seats of the lower tier are arranged in the same way, the back portions 19' thereof being adapted to rest in the intermediate reclining position on pins 28' and in the horizontal position when the pin 28' is inserted in opening 29', while the seat portion 18' slides forwardly on cross bar 27' so that the seat pivots to a degree about bolt 22'. Only the foot rest 32' differs in that it is normally stored in a horizontal position but is angularly adjustable in arcuate slot 34' and has hooks 36' which attach to pins 37' in the forward edge of the seat portion 18', as before.

It will be observed that the superposed seats are positioned back to back, but that the mounting is such that the relative horizontal and vertical arrangement thereof places the back portions 19 and 19' in substantially the same vertical plane when erect, as indicated by line A—A in Figure 4. Also, the back portion 19 of the upper seat overlaps and overhangs the lower seat when in intermediate and horizontal positions, and the top of the back portion 19' of the lower seat clears the upper seat portion 18 when swung downwardly into a recess 39 between the panels 13 and 13'. Thus, the lower seat underlaps the upper seat when in intermediate and horizontal positions, as shown in the right-hand illustration in Figure 2. Hence, although the adjacent seats are closely spaced, the arrangement of this invention requires no additional space for the horizontal or sleeping berth position.

Curtains along the passageway may be provided, and each seat may have its window 40, to afford the privacy and the freedom of external view for each pair of seats in both upper and lower tiers. When the lower seats are not inclined to the horizontal sleeping position, the recess 39 between the panels 13 and 13' may be utilized for short haul storage, whereas the spaces 41 under the floors 15 may be used for general storage at all times, such as for pillows, blankets, curtains, etc.

Although a preferred embodiment of the invention has been illustrated and described herein, the invention is not limited thereby, but is susceptible of changes within the scope of the appended claims.

I claim:

1. In a convertible seat and sleeping berth arrangement for a passenger vehicle, the combination of a pair of seats each comprising a seat portion and normally erect back portion movable to reclining position, and means mounting said seats in reverse and vertically displaced positions with the upper edge of the back portion of the lower seat positioned at lower level than the seat portion of the upper seat, whereby the back portion of the upper seat overlaps the lower seat and the back portion of the lower seat underlaps the upper seat when moved to their respective reclining positions.

2. In a convertible seat and sleeping berth arrangement for a passenger vehicle, the combination of a pair of seats arranged back-to-back and each comprising a seat portion and normally erect back portion movable to reclining position, and means mounting said seats in vertically displaced positions with the upper edge of the back portion of the lower seat located adjacent the rear edge of the seat portion of the upper seat, whereby the back portion of the upper seat swings back over the lower seat and the back portion of the lower seat swings back under the upper seat when moved to their respective reclining positions.

3. In a convertible seat and sleeping berth arrangement for a passenger vehicle, the combination of a pair of seats each comprising a seat portion and a normally erect back portion movable to reclining position, and means mounting said seats in reverse and vertically displaced positions with the back portion of the lower seat below and substantially in the same vertical plane as the back portion of the upper seat, whereby the back portion of the upper seat swings back over the lower seat and the back portion of the lower seat swings back under the upper seat when moved to their respective reclining positions.

4. In a convertible seat and sleeping berth arrangement for a passenger vehicle, the combination of a pair of seats each comprising a seat portion and a normally erect back portion movable to a reclining position, a pair of parallel fixed vertical panels defining a compartment, and means mounting said seats in reverse and vertically displaced positions between said panels with the upper edge of the back portion of the lower seat positioned at lower level than the seat portion of the upper seat, whereby the back portion of the upper seat swings back over the lower seat and the back portion of the lower seat swings back under the upper seat when moved to their respective reclining positions, thereby to provide at least two aligned sleeping berths between said panels, said berths being juxtaposed and overlapping vertically whereby the total length of the two berths exceeds the spacing of said panels.

5. In a convertible seat and sleeping berth arrangement for a passenger vehicle, the combination of a pair of seats each comprising a seat portion and a normally erect back portion movable to a reclining position, and pivotal means mounting said seats in reverse and vertically displaced positions with the upper edge of the back portion of the lower seat positioned at lower level than the seat portion of the upper seat, whereby the back portion of the upper seat swings back over the lower seat and the back portion of the lower seat swings back under the upper seat when moved to their respective reclining positions.

6. In a convertible seat and sleeping berth arrangement for a passenger vehicle, the combination of a pair of seats each comprising a seat portion and a normally erect back portion movable to a reclining position, a pair of parallel fixed vertical panels, substantially horizontal bars pivoted between said panels at different levels, and means mounting said seats in reverse and vertically displaced positions on said bars with the upper edge of the back portion of the lower seat positioned at lower level than the seat portion of the upper seat, whereby the back portion of the upper seat swings back over the lower seat and the back portion of the lower seat swings back under the upper seat when moved to their respective reclining positions.

7. In a convertible seat and sleeping berth arrangement for a passenger vehicle, the combination of a pair of seats facing in opposite directions and each comprising a seat portion and a normally erect back portion movable to reclining position, a pair of parallel fixed vertical panels, and means pivoted on said panels at vertically displaced positions and mounting the seat and back portions of each seat with the upper edge of the back portion of the lower seat located adjacent the rear edge of the seat portion of the upper seat, whereby the back portion of the upper seat swings back over the lower seat and the back portion of the lower seat swings back under the upper seat when moved to their respective reclining positions.

8. In a convertible seat and sleeping berth arrangement for a passenger vehicle, the combination of a pair of seats facing in opposite directions and each comprising a seat portion and a normally erect back portion, hinge means connecting the back portions to the seat portions for movement of the back portion to reclining position, a pair of spaced vertical panels, vertically spaced bars pivoted intermediate their ends on said panels, pivotal connections between one end of each bar and the back portion of the corresponding seat, and an adjustable connection between the other end of each bar and the corresponding panel, whereby the seats are mounted in vertically displaced positions between said panels and the back portion of the upper seat swings back over the lower seat and the back portion of the lower seat swings back under the upper seat upon adjustment of said corresponding connections.

9. In a convertible seat and sleeping berth arrangement for a passenger vehicle, the combination of a pair of seats facing in opposite directions and each comprising a seat portion and a normally erect back portion, hinge means connecting the back portion to the seat portion for movement of the back portion to reclining position, a pair of spaced vertical panels, vertically spaced horizontal bars pivoted intermediate their ends on said panels, pivotal connections between one end of each bar and the back portion of the corresponding seat, an arcuate locking means on each panel having its center of curvature at the pivot of the corresponding bar, and an adjustable connection between the other end of each bar and the corresponding locking means, whereby the seats are mounted in vertically displaced positions between said panels and the back portion of the upper seat swings back over the lower seat and the back portion of the lower seat swings back under the upper seat upon adjustment of said corresponding connections.

10. In a convertible seat and sleeping berth arrangement for a passenger vehicle, the combination of a first seat having a relatively fixed seat portion and a movable back portion, means holding said back portion alternatively in substantially erect and substantially horizontal reclining position, a second seat having a relatively fixed seat portion and a movable back portion, means holding said second seat back portion alternatively in substantially erect and substantially horizontal reclining positions, and means mounting said seats in back-to-back vertically displaced positions with their back portions in substantially the same vertical plane when erect, whereby the upper seat back portion overlaps the lower seat when in reclining position.

11. In a convertible seat and sleeping berth arrangement for a passenger vehicle, the combination of a first seat having a relatively fixed seat portion and a movable back portion, means holding said back portion alternatively in substantially erect and substantially horizontal reclining position, a second seat having a relatively fixed seat portion and a movable back portion, means holding said second seat back portion alternatively in substantially erect and substantially horizontal reclining positions, a pair of spaced vertical panels, pivotal means mounting said seats in vertically displaced positions in and between said panels, and adjustable connections between the pivotal means and the holding means of the corresponding seat for adjusting the back portion thereof to reclining position.

12. In a convertible seat and sleeping berth arrangement for a passenger vehicle having a passageway, the combination of a platform positioned to the side and above the level of said passageway, a first seat mounted on said platform and having a seat portion contained in a fixed horizontal plane and a movable back portion, a second platform positioned to said side and below the level of said passageway, a second seat mounted on said second platform below said first seat and having a relatively fixed seat portion and a movable back portion, said seats facing in opposite directions, and adjustable means holding said seat back portions alternatively in substantially erect and substantially horizontal reclining positions, whereby the upper seat back portion overlaps the lower seat when swung back to a horizontal reclining position.

13. In a convertible seat and sleeping berth arrangement for a passenger vehicle having a passageway, the combination of an upper tier and a lower tier of seats along one side of said passageway, transversely spaced pairs of panels spaced along said passageway, and mounting an upper and a lower seat between each said pair of panels, transverse platforms between each pair of panels for access to the corresponding seat from the passageway, each seat having a seat portion fixed in a horizontal plane and a movable back portion, and adjustable means mounted on the corresponding panel for holding said back portion alternatively in substantially erect and substantially horizontal reclining position, whereby the upper seat back portion overlaps the seat portion of the lower seat when swung back in horizontal reclining position.

14. In a convertible seat and sleeping berth arrangement for a passenger vehicle having a passageway, the combination of an upper tier and a lower tier of seats along one side of said passageway, transversely spaced pairs of panels spaced along said passageway, and mounting an upper and a lower seat between each said pair of panels, the upper tier seats and lower tier seats facing in opposite directions, transverse platforms between each pair of panels for access to the corresponding seat from the passageway, each seat having a relatively fixed seat portion and a movable back portion, and adjustable means mounted on the corresponding panel for holding said back portion alternatively in substantially erect and substantially horizontal reclining position, whereby the upper seat back portion overlaps the seat portion of the lower seat when swung back in horizontal reclining position.

15. In a convertible seat and sleeping berth arrangement for a passenger vehicle having a passageway, the combination of transversely spaced panels arranged in longitudinally spaced pairs along said passageway, a transverse platform between said pair of panels and leading from said passageway, alternate platforms having a higher level than the remaining platforms, an upper seat and a lower seat mounted between each pair of panels at levels corresponding to the respective platforms, and hinge means mounting the back portion of each seat for reclining movement between the corresponding panels, said upper and lower seats forming two berths overlapping at head and toe and spaced apart vertically at a distance corresponding to the total difference in level between alternate platforms.

16. In a convertible seat and sleeping berth arrangement for a passenger vehicle having a passageway, the combination of transversely spaced panels arranged in longitudinally spaced pairs along said passageway, a transverse platform between said pair of panels and leading from said passageway, alternate platforms having a higher level than the remaining platforms, an upper seat and a lower seat mounted between each pair of panels at levels corresponding to the respective platforms and facing in opposite directions, and hinge means mounting the back portion of each seat for reclining movement between the corresponding panels, said upper and lower seats forming two berths overlapping at head and toe and spaced apart vertically at a distance corresponding to the difference in level between alternate platforms.

17. In a convertible seat and sleeping berth arrangement for a passenger vehicle having a passageway, the combination of transversely spaced panels arranged in longitudinally spaced pairs along said passageway, each pair of transversely spaced panels corresponding to one multiple seat unit, a transverse platform between said pair of panels and leading from said passageway, alternate platforms having a higher level than the remaining platforms, an upper seat and a lower seat mounted between each pair of panels at levels corresponding to the respective platforms and facing in opposite directions, said oppositely facing upper and lower seats forming cooperatively one of said multiple seat units, hinge means mounting the back portion of each seat for reclining movement between the corresponding panels, transverse partitions between the facing seats of adjacent longitudinally spaced units, and a foot rest movably mounted in the partition corresponding to the seat facing the same.

18. In a convertible seat and sleeping berth arrangement for a passenger vehicle, the combination of a pair of spaced vertical panels mounted on the vehicle, substantially horizontal bars pivoted intermediate their ends on the inside of each panel for movement about the common axis of their pivots, transverse supporting means extending inwardly from each panel adjacent one end of the corresponding bars, a substantially horizontal seat portion and a normally erect back portion hinged together at their abutting edges, a pivotal supporting connection between the other ends of said bars and the back portion, a sliding supporting connection between the seat portion and said transverse supporting means, and a vertically adjustable locking connection between the said one end of each of said bars and the corresponding panel, whereby the back portion may be adjusted from normally erect to reclining positions as the seat portion slides on said transverse supporting means.

GEORGE A. JERGENSON.

REFERENCES CITED

The following references are of record in the file of this patent:

UNITED STATES PATENTS

| Number | Name | Date |
| --- | --- | --- |
| 204,684 | Robinson | June 11, 1878 |
| 475,791 | Morrison | May 31, 1892 |
| 2,081,529 | Canney | May 25, 1937 |
| 2,280,065 | De Roode | Apr. 21, 1942 |
| 2,332,841 | Burton et al. | Oct. 26, 1943 |